Patented Jan. 27, 1953

2,626,948

UNITED STATES PATENT OFFICE 2,626,948

1-ALKYL-2 OR 4-[(N-ALKYL-N-β-DIALKYL-AMINOALKYL) AMINOPHENETHYL] - PIPERIDINES AND SALTS THEREOF

Jacob Finkelstein, East Paterson, and John Lee, Essex Fells, N. J., assignors to Hoffmann-La Roche Inc., Nutley, N. J., a corporation of New Jersey No Drawing. Application July 24, 1950, Serial No. 175,655

12 Claims. (Cl. 260—293)

This invention relates to new chemical compounds, which can be described broadly as certain substituted piperidine bases and their acid addition salts. These piperidine bases and their acid addition salts are useful in the field of therapeutics, and are especially of interest in the field of trichomonal and amoebic infections.

More particularly, the piperidine bases of the invention are those of the class consisting of 1-alkyl-2-[(N - alkyl - N - β - dialkylaminoalkyl) - aminophenethyl]-piperidines and 1-alkyl-4-[(N-alkyl - N-β-dialkylaminoalkyl) aminophenethyl]-piperidines; that is, compounds which can be considered as structurally derived from piperidine by substitution of an alkyl radical in the 1-position and of an (N-alkyl-N-β-dialkylaminoalkyl) aminophenethyl radical in either the 2- or 4-position thereof, the piperidine being otherwise unsubstituted. The alkyl groups can be the same or different. The following compounds can be instanced as illustrative of these piperidines: 1-methyl-2-[4-(N - methyl - N - β - diethylaminoethyl)-aminophenethyl]-piperidine, 1-n-hexyl-2-[4 - (N - methyl-N-β-diethylaminoethyl) aminophenethyl] - piperidine, 1-methyl-4-[4-(N-methyl-N-β-diethylaminoethyl) aminophenethyl]-piperidine, and 1-ethyl-4-[4-(N-methyl-N-β-diethyl aminoethyl) aminophenethyl] - piperidine. The compounds of the invention can be represented by the following general Formulae (I) and (II), in which $R^1$, $R^2$, $R^4$ and $R^5$ each represents an alkyl group and $R^3$ represents an alkylene group:

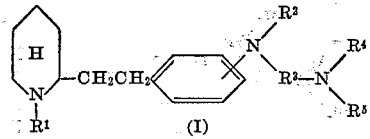

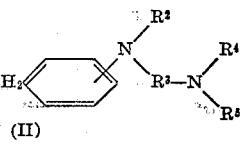

The salts of the invention are the acid addition salts of the above piperidines with inorganic and organic acids, and particularly with non-toxic acids, such as hydrochloric, hydrobromic, sulfuric, phosphoric, acetic, maleic, and tartaric acids, and the like.

The piperidine bases can be prepared by a process comprising reacting an alkyl halide quaternary salt of a methyl-substituted pyridine (e. g. α-picoline methiodide or γ-picoline ethiodide) with an (N-alkyl-N-β-dialkylaminoalkyl) aminobenzaldehyde to form a 1-alkyl-2(or 4)-[(N-alkyl - N - β - dialkylaminoalkyl) aminostyryl]-pyridinium salt, and catalytically reducing the latter to form an acid addition salt of a 1-alkyl-2(or 4)-[(N-alkyl-N-β-dialkylaminoalkyl) aminophenethyl]-piperidine. The free 1-alkyl-2(or 4)-[(N-alkyl-N-β-dialkylaminoalkyl) - aminophenethyl]-piperidine base can be liberated from the latter salt by alkalinization, and can then be converted to any desired acid addition salt by treatment with the appropriate acid.

The invention is further disclosed in the following examples, which are illustrative but not limitative thereof.

EXAMPLE 1

*1-methyl-2-[4-(N-methyl - N - β - diethylaminoethyl) aminophenethyl]-piperidine*

A mixture of 1000 g. of N-methylaniline, 1073 g. of β-diethylaminoethyl chloride hydrochloride, 800 cc. of ethanol and 850 g. of crystalline sodium acetate was refluxed for 8 hours while stirring. Then the reaction mixture was cooled and water was added thereto, resulting in separation into an aqueous phase and an oily phase. The oily phase was extracted with ether, the ether extract was dried over potassium carbonate and then was concentrated by removal of the solvent. The residue was distilled under reduced pressure and the fraction boiling at 110°–115° C. at 2 mm. Hg was collected. This product was N-methyl-N-β-diethylaminoethyl-aniline.

In a 3-neck flask equipped with stirrer, condenser, thermometer, and dropping funnel, were placed 100 cc. of dry benzene, and 135 g. of N-methylformanilide were added thereto. While stirring and cooling to keep the temperature between 5° and 15° C., 153.5 g. of phosphorus oxychloride were added dropwise. The reaction mixture was stirred at room temperature for about 2 hours. Then the mixture was cooled to 5°–15° C., and 109 g. of N-methyl-N-β-diethylaminoethyl-aniline were added slowly while stirring. The mixture became very viscous and in order to make it more fluid, it was warmed to 60°–70° C., then it was stirred at that temperature for 2 hours. At the end of this time, it was poured onto ice and allowed to stand for approximately 60 hours. Then it was made alkaline with 30 per cent NaOH, and the oil which was liberated was extracted with benzene. The benzene was removed from the extract, and the residual oil was fractionated under reduced pressure. The fraction boiling at 165°–177° C. at 1 mm. Hg was p-(N-methyl - N - β - diethylaminoethyl) aminobenzaldehyde.

9.3 g. of α-picoline was mixed with 14.2 g. of methyl iodide and allowed to react spontaneously. The resulting white solid, 1,2-dimethyl-pyridinium iodide (α-picoline methiodide) was washed with alcohol, to remove unreacted starting materials.

A mixture of 11.8 g. of 1,2-dimethyl-pyridinium iodide, 11.7 g. of p-(N-methyl-N-β-diethylaminoethyl)aminobenzaldehyde, 20 cc. of ethanol, and 0.5 cc. of piperidine was refluxed for 21 hours. The reaction mixture was cooled and the precipitate was filtered off and recrystallized from alcohol. The product obtained was 1-methyl-2 - [4 - (N - methyl - N - β - diethylaminoethyl) - styryl]-pyridinium iodide, M. P. approximately 164°–165° C.

45 g. of the latter product suspended in 300 cc. of 95 per cent alcohol was catalytically reduced in the presence of 0.2 g. of platinum dioxide at 50° C. and under 200 lbs. hydrogen pressure. The reaction mixture was filtered to remove the catalyst, and to the resulting filtrate was added excess dilute sodium hydroxide. The oil which separated was extracted with ether. The extract was washed with water, dried over potassium carbonate, and the solvent removed therefrom. The residual oil was concentrated under reduced pressure. The fraction having a B. P. of approximately 193° C. at 0.5 mm. Hg was 1-methyl-2-[4-(N-methyl-N-β-diethylaminoethyl) aminophenethyl]-piperidine.

The trihydrochloride of the latter product was prepared by reacting 15 g. of the free base with 136 cc. of 1N HCl.

EXAMPLE 2

*1-ethyl-2-[4-(N-methyl-N-β-diethylaminoethyl) aminophenethyl]-piperidine*

1-ethyl-2-methyl-pyridinium iodide (α-picoline ethiodide) was prepared by mixing 100 g. of ethyl iodide with 62 g. of α-picoline; slight warming started the reaction, which then continued spontaneously until the entire reaction mixture was solid. The solid was washed with alcohol to remove unreacted starting materials.

A mixture of 34.5 g. of 1-ethyl-2-methyl-pyridinium iodide, 34 g. of p-(N-methyl-N-β-diethylaminoethyl)aminobenzaldehyde, 75 cc. of ethanol, and 5 cc. of piperidine was refluxed for 4 hours. The product, isolated in the manner described in Example 1, was 1-ethyl-2-[4-N-methyl - N - β - diethylaminoethyl) aminostyryl]-pyridinium iodide.

116 g. of the latter product in 1100 cc. of 95 per cent alcohol was catalytically reduced in the presence of 0.3 g. of platinum dioxide at 50° C. and under 200 lbs. hydrogen pressure. The reaction mixture was worked up in the manner described in Example 1. The product, having a B. P. of approximately 193°–205° C. at 1 mm. Hg, was 1-ethyl-2-[4-N - methyl - N - β - diethylaminoethyl) aminophenethyl]-piperidine.

The trihydrochloride of the latter product was prepared by reacting 9.94 g. of the free base with 86.33 cc. of 1N HCl.

EXAMPLE 3

*1-n-hexyl-2-[4-(N-methyl-N-β-diethylaminoethyl) aminophenethyl]piperidine*

93 g. of α-picoline was mixed with 165 g. of n-hexyl bromide and heated at 135°–140° C. for 24 hours. After standing for an hour, the reaction mixture was extracted alternately with ether and petroleum ether several times. The extracts were discarded and the insoluble oil was allowed to stand at 0° C. for about 15 hours to crystallize. The resulting crystalline material was filtered off and washed with ether and petroleum ether. It was 1-n-hexyl-2-methyl-pyridinium bromide(α-picoline n-hexyl bromide).

A mixture of 59 g. of 1-n-hexyl-2-methyl-pyridinium bromide, 56 g. of p-(N-methyl-N-β-diethylaminoethyl) aminobenzaldehyde, 100 cc. of ethanol and 10 cc. of piperidine was refluxed for 20 hours. The reaction mixture was concentrated by distilling off as much of the alcohol as possible. The residue was allowed to stand at 0° C. for 3 days, and the crystalline precipitate was filtered off. After recrystallization from isopropanol, the product melted at approximately 194°–197° C. It was 1-n-hexyl-2-[4-(N-methyl-N-β-diethylaminoethyl) aminostyryl]-pyridinium bromide.

118.5 g. of the latter product in 1100 cc. of 95 per cent alcohol was catalytically reduced in the presence of platinum dioxide at 50° C. and under 200 lbs. hydrogen pressure. The product was isolated in the manner described in Example 1. It was 1-n-hexyl-2-[4-(N-methyl-N-β-diethylaminoethyl) aminophenethyl]-piperidine, B. P. approximately 225° C. at 1 mm. Hg.

The trihydrochloride of the latter product was prepared by reacting 20 g. of the base with approximately 150 cc. of 1N HCl.

EXAMPLE 4

*1-methyl-4-[4-(N-methyl-N-β-diethylaminoethyl) aminophenethyl]-piperidine*

1,4 - dimethyl - pyridinium iodide (γ - picoline methiodide) was prepared by reacting 93 g. of γ-picoline with 14.2 g. of methyl iodide. A mixture of 11.8 g. of 1,4-dimethyl-pyridinium iodide, 11.7 g. of p-(N-methyl-N-β-diethylaminoethyl-aminobenzaldehyde, 20 cc. of ethanol and 0.5 cc. of piperidine was refluxed for 21 hours. The crystalline product recovered from the reaction mixture was 1-methyl-4-[4-(N-methyl-N-β-diethylaminoethyl) aminostyryl]-pyridinium iodide, M. P. approximately 165°–172° C.

46.5 g. of the latter product in 250 cc. of 95 per cent alcohol was catalytically reduced in the presence of platinum dioxide at 50° C. under 200 lbs. hydrogen pressure. The reaction mixture was worked up in the manner described in Example 1. The product, 1-methyl-4-[4-(N-methyl - N - β - diethylaminoethyl) aminophenethyl]-piperidine, had a B. P. of approximately 192°–198° C. at 0.5 mm. Hg.

The dihydrochloride of the latter base was prepared by reacting 12.3 g. of the free base with 74.2 cc. of 1N HCl.

EXAMPLE 5

*1 - ethyl - 4 - [4 - (N - methyl - N - β - diethylaminoethyl) aminophenethyl] - piperidine*

93 g. of γ-picoline were mixed with 156 g. of ethyl iodide in benzene and refluxed. After 2 hours, the reaction mixture was cooled. The precipitated product, 1 - ethyl - 4 - methyl-pyridinium iodide(γ-picoline ethiodide) was filtered off.

A mixture of 12.5 g. of 1-ethyl-4-methyl-pyridinium iodide, 11.7 g. of p-(N-methyl-N-β-diethylaminoethyl) aminobenzaldehyde, 15 cc. of ethanol, and 1 cc. of piperidine was refluxed for 18 hours. The product was 1-ethyl-4-[4-(N- methyl - N - β - diethylaminoethyl) aminostyryl] - pyridinium iodide.

52.7 g. of the latter product in 250 cc. of 95 per cent alcohol was catalytically reduced in the presence of platinum dioxide at 42° C. and under 250 lbs. hydrogen pressure. The reaction mixture was worked up in the manner described in Example 1. The product, B. P. approximately 200°-204° C. at 0.5 mm. Hg, was 1-ethyl-4-[4- (N - methyl - N - β - diethylaminoethyl) amino- phenethyl]-piperidine.

The dihydrochloride of the latter compound was prepared by reacting 12.38 g. of the free base with 71.70 cc. of 1 N HCl.

EXAMPLE 6

*1 - n - hexyl - 4 - [4 - (N - methyl - N - β - diethylaminoethyl) aminophenethyl] -piperidine*

1 - n - hexyl - 4 - methyl - pyridinium bromide (γ-picoline-n-hexyl bromide) was prepared by heating 93 g. of γ-picoline with 139 g. of n-hexyl bromide at 135°-140° C. for 24 hours. After cooling the reaction mixture, the unreacted starting materials were removed from the crystalline product by extraction with dry ether.

A mixture of 129 g. of 1-n-hexyl-4-methyl-pyridinium bromide, 117 g. of p-(N-methyl-N-β-diethylaminoethyl) aminobenzaldehyde, 250 cc. of alcohol, and 15 cc. of piperidine was refluxed for 16 hours. The crystalline product recovered from the reaction mixture was 1-n-hexyl-4-[4- (N - methyl - N - β - diethylaminoethyl) amino- styryl]pyridinium bromide.

40.7 g. of the latter compound in 250 cc. of 95 per cent alcohol was catalytically reduced in the presence of platinum dioxide at 50° C. and under 200 lbs. hydrogen pressure. The product was isolated in the manner described in Example 1. It was 1-n-hexyl-4-[4-(N-methyl-N-β - diethylaminoethyl) aminophenethyl] - piperidine B. P. approximately 219° C. at 0.1 mm. Hg.

The dihydrochloride of the latter compound was prepared by reacting 8.46 g. of the free base with 42.13 cc. of 1 N HCl.

We claim:

1. 1 - ethyl - 2 - [4 - (N - methyl - N - β-diethylaminoethyl) aminophenethyl] - piperidine.
2. 1 - n - hexyl - 2 - [4 - (N - methyl - N - β-diethylaminoethyl) aminophenethly] - piperidine.
3. 1 - methyl - 4 - [4 - (N - methyl - N - β - diethylaminoethyl) aminophenethyl] - piperidine.
4. A compound selected from the group consisting of 1 - alkyl - 2 - [(N - alkyl - N - β - dialkylaminoalkyl) aminophenethyl] - piperidines, 1 - alkyl - 4 - [(N - alkyl - N - β - dialkylaminoalkyl) aminophenethyl] - piperidines, and acid addition salts of said piperidines; each of the alkyl groups in said compound being a lower alkyl group.
5. A 1 - alkyl - 2 - [4 - (N - alkyl - N - β - dialkylaminoalkyl) aminophenethyl] - piperidine, each of the alkyl groups therein being a lower alkyl group.
6. An acid addition salt of a compound accord to claim 5.
7. A 1 - alkyl - 4 - [4 - (N - alkyl - N - β - dialkylaminoalkyl) aminophenethyl] - piperidine, each of the alkyl groups therein being a lower alkyl group.
8. An acid addition salt of a compound according to claim 7.
9. 1 -methyl - 2 - [4 - (N - methyl - N - β - diethylaminoethyl) aminophenethyl] - piperidine.
10. An acid addition salt of the compound of claim 9.
11. A hydrohalide of the compound of claim 9.
12. 1 - methyl - 2 - [4 - (N - methyl - N - β - diethylaminoethyl) aminophenethyl] - piperidine trihydrochloride.

JACOB FINKELSTEIN.
JOHN LEE.

REFERENCES CITED

The following references are of record in the file of this patent:

FOREIGN PATENTS

| Number | Country | Date |
| --- | --- | --- |
| 595,631 | Great Britain | Dec. 11, 1947 |

OTHER REFERENCES

Phillips: J. Org. Chem., vol. 12, pp. 333–341 (1947).

Phillips: J. Org. Chem., vol. 14, pp. 302–305 (1949).

Phillips: Chem. Abstr., vol. 44, cols. 9964–9965 (1950).